UNITED STATES PATENT OFFICE.

JOHN COLLINS CLANCY, OF PROVIDENCE, RHODE ISLAND, ASSIGNOR TO THE NITROGEN CORPORATION, OF PROVIDENCE, RHODE ISLAND, A CORPORATION OF RHODE ISLAND.

PROCESS OF DESULPHURIZING OIL.

1,423,710. Specification of Letters Patent. Patented July 25, 1922.

No Drawing. Application filed July 8, 1920. Serial No. 394,818.

*To all whom it may concern:*

Be it known that I, JOHN COLLINS CLANCY, subject of the King of Great Britain, residing at Providence, in the county of Providence and State of Rhode Island, have invented certain new and useful Improvements in Processes of Desulphurizing Oil, of which the following is a specification.

This invention relates to the purification of mineral oils and the like and more especially concerns a process whereby such oils, even when they bear a high sulfur content, may be substantially completely desulphurized.

One of the principal objects of my invention is, hence, to accomplish this desulphurization rapidly and economically; while another object is to not merely eliminate sulfur from the oil,—desirable as such elimination is,—but, further, to recover the sulfur in useful form and in combination with certain other elements.

Various mineral oils, especially many of those produced in Mexico and in parts of Texas, have such a high content of sulfur as to seriously interfere with and, indeed, frequently prevent their successful commercial cracking, to produce gasoline and the like therefrom.

These sulfur bearing oils may be distilled; but the kerosene, or like distillate, contains so much sulfur as to render practically impossible the commercial catalytic conversion of such kerosene to, for example, gasoline.

As a result, commonly such oils are sold simply as crude products.

Further, even if but a small quantity of sulfur be present in kerosene, or like material,—so that such material may be successfully cracked,—there is still the objection that more or less of the sulfur will be found in the gasoline thus produced; and when this latter substance is used as fuel in an internal combustion engine the walls of which are of iron or steel, these walls are in time injured thereby, as a result of the formation of iron sulfid.

One of the principal reasons why sulfur is so difficultly removable from oils, resides in the nature of these hydrocarbon compounds, which prevents the requisite penetration of any mass or bulk of such compounds by a sulfur removing agent, whereby to enable said agent to gain direct access to all of the sulfur.

Moreover, even if an agent be found which is capable of thus being mixed with the oil with the utmost intimacy; still it is then necessary that this agent react upon or with the sulfur to form a compound which can be removed from the oil, and this at a reasonably low temperature.

If the reaction requires a high temperature, the agent may be driven out of the oil before it has accomplished its purpose; or the oil may even be impaired.

I have made the discovery, however, that an efficient desulphurizing agent of the character in question does exist; the said agent being one which fulfills all of the rather onerous conditions. The material to which I refer is liquid ammonia.

When one considers the nature of this material and compares it with that of crude oil, kerosene or the like, it would appear at first thought to be wholly impossible to effect any satisfactory mixture of these substances.

Very singularly, however, anhydrous or substantially anhydrous liquid ammonia is very freely miscible with mineral oil,—much like alcohol and water. The mixture may be, for example, one of 50 parts by volume of crude oil, or kerosene, or the like, to 50 parts of liquid ammonia; although I preferably use a smaller proportion of ammonia, as hereinafter described.

The oil will actually absorb liquid ammonia to the extent of about 10% of the volume of the oil; so that the resultant volume of the mixture will be less, by this amount, than might otherwise be anticipated.

The liquid ammonia should preferably be introduced into the oil under pressure sufficient to maintain the ammonia in the liquid phase, even when the operation is conducted at room temperatures. Under these conditions, what then transpires is that a portion of the ammonia combines with the sulfur present in the oil to form ammonium sulfid.

I have made the further discovery that if a small quantity of metallic sodium, potassium, calcium, barium, or other alkalinous metal, be present in solution in the liquid ammonia thus mixed with the oil to be treated,—the desulphurization of the latter proceeds much more vigorously.

For the purpose of avoiding circumlocution, I use the term "alkalinous" metal throughout the specification and claims to designate generally metals belonging to the alkali and alkali earth metal groups.

It will readily be appreciated that since the formation of ammonium sulfid in the above described manner, takes place at room temperature and even lower, this formation, in the absence of such a catalyst as sodium, or the like, is somewhat slow; however, even when but a trace of alkalinous metal is present, the reaction proceeds quite vigorously.

As to whether the catalytic material remains in solution as such, or whether it more or less evanescently combines with the sulfur and ammonia,—I cannot say. I am of the opinion that there is some combination of this description.

The preferred mode of reacting upon the sulfur content of a given body of oil, with ammonia, in the manner above described, is to place a mass of distillate, such as kerosene or the like, in a columnar receptacle and then introduce the liquid ammonia,—preferably with a small quantity of the alkalinous metal already in solution therein,—at the bottom of the column and under pressure, as aforesaid.

The liquid ammonia is then flowed in continuously and finds its way up through the mass of oil; completely mixing with all parts of the latter.

After the ammonium sulfid formation has proceeded to completion, I preferably withdraw the mixture of oil and ammonia from the receptacle in which the sulfid was formed and, in a second receptacle, wash out the sulfid by means of water.

In order not to lose the ammonia which has been absorbed by the oil, I find it preferable to acidulate the water, as by sulfuric acid, to a degree commensurate with the volume of ammonia absorbed. The acid present in the water will react with the ammonia to form ammonium sulfate.

In the operation just described, desirably but just sufficient water is used, to accomplish the intended purpose. In fact, preferably but very little water is used at the start, to form a quite highly concentrated solution of the ammonium sulfate and ammonium sulfid. The ammonium sulfid may readily be converted into the sulfate in a number of known ways; as, for example, by blowing air through the said concentrated solution.

More water may now be added, if found desirable, and the oil may be drawn off.

The anhydrous ammonia, while soluble to some measure in the oil and while freely miscible with the latter, is nevertheless very much more highly soluble in water and, hence, I prefer to use water in effecting this separation of the ammonia and ammonium sulfid from the oil; especially on account of the almost complete separation of the oil from the water which may self-evidently be thereafter quite readily effected. The sodium, or like catalytic material employed, comes out of the oil in the washing operation, in the form of a sodium compound, the nature of which I have not thus far exactly determined.

The result is a complete freeing of the oil or kerosene from sulfur; without contamination by any deleterious residue as a consequence of the process.

It is by no means necessary that a crude oil distillate be treated in the above fashion; but I prefer so to do rather than to treat the crude oil per se; since by reason of the distillation extraneous mineral matter, other than the sulfur, may be nearly completely eliminated.

The oil product obtained by the above described desulphurizing process may, of course, be further purified, if desired, by washing with alkaline waters, or like washes.

I may add that it is by no means essential that the oil be washed with water before separation of the ammonia, or rather the bulk of the latter; since the temperature of the oil and liquid ammonia mixture may be elevated sufficiently to drive off the ammonia in large part; after which the oil may be washed with acidulated water to form the concentrated solution of ammonia sulfid and ammonium sulfate above described.

Also, since I have discovered that liquid ammonia and mineral oil may be mixed in almost any proportion desired; I do not wish to be limited to any particular proportions, and, in fact, in practicing the above process,—in order to conserve liquid ammonia,—I preferably mix with a given bulk of oil a considerably less quantity of liquid ammonia; it being merely necessary to employ sufficient of the latter to complete desulphurization of the oil. The proportion of liquid ammonia to oil, in practice, will hence depend upon the content of sulfur in the oil, as shown by analysis.

By the term mineral oil as employed in the specification and claims I propose to designate broadly not only the crude oil before it has been subjected to refining operations, but such distillates and derivatives thereof as naturally lend themselves to treatment for removal of sulfur compounds therefrom, including lubricating oils, kerosene, gasoline, and the like.

Having described my invention, what I claim is:

1. The process of purifying mineral oil, which comprises, treating a mass of said oil with liquid anhydrous ammonia to cause the sulfur present in said oil to combine with said ammonia to form an ammonia-sulfur compound, and separating said compound from the oil.

2. The process of purifying mineral oil, which comprises, treating a mass of said oil with liquid anhydrous ammonia at a low temperature to cause the sulfur present in said oil to combine with said ammonia to form an ammonia-sulfur compound, and separating said compound from the oil.

3. The process of purifying mineral oil, which comprises, treating a mass of said oil with liquid anhydrous ammonia under pressure and at a low temperature for causing the sulfur present in said oil to combine with said ammonia to form an ammonia-sulfur compound, and separating said compound from the oil.

4. In a process of desulphurizing mineral oil the step which comprises treating a mass of said oil with liquid anhydrous ammonia, to form an intimate mixture, and causing the sulfur present in said oil to react with the ammonia, to form a readily separable sulfur compound.

5. The process of desulphurizing mineral oil, which comprises treating a mass of said oil with liquid anhydrous ammonia under pressure, to form an ammonia-sulfur compound, and separating said compound from the oil by washing the oil with water.

6. The process of desulphurizing mineral oil, which comprises treating a mass of said oil with liquid anhydrous ammonia under pressure, to form an ammonia-sulfur compound, and separating said compound from the oil by washing the oil with acidulated water.

7. In a process of desulphurizing mineral oil the step which comprises treating a mass of said oil with liquid ammonia in which is dissolved an alkalinous metal, to form an ammonia-sulfur compound.

8. The process of desulphurizing mineral oil, which comprises treating a mass of said oil with liquid ammonia in which is dissolved an alkalinous metal, to form an ammonia-sulfur compound, and then treating said oil and liquid ammonia with a solvent capable of removing both ammonia and the said sulfur compound.

9. The process of desulphurizing mineral oil, which comprises treating a mass of said oil with liquid ammonia in which is dissolved an alkalinous metal, to form an ammonia-sulfur compound, then treating said oil and liquid ammonia with a solvent capable of dissolving both ammonia and the said sulfur compound, and mechanically separating the oil from said solvent while the latter contains said sulfur compound in solution therein.

10. In a process of purifying mineral oil the step which comprises reacting upon said oil with ammonia in the presence of a catalyst to cause the sulfur present in the oil to combine with the ammonia.

11. In a process of purifying mineral oil the step which comprises reacting upon said oil with ammonia at a low temperature and in the presence of a catalyst to cause the sulfur present in said oil to combine with the ammonia.

12. In a process of purifying mineral oil the step which comprises reacting upon said oil with ammonia under pressure and in the presence of a catalyst to cause the sulfur present in said oil to combine with the ammonia.

13. In a process of purifying mineral oil the step which comprises reacting upon said oil with ammonia in the presence of an alkalinous metal to cause the sulfur present in said oil to combine with the ammonia.

14. In a process of purifying mineral oil the step which comprises treating a mass of said oil with liquid anhydrous ammonia.

15. In a process of purifying mineral oil the step which comprises treating a mass of said oil with liquid anhydrous ammonia under pressure.

16. In a process of purifying mineral oil the step which comprises treating a mass of said oil with liquid anhydrous ammonia in the presence of a catalyst.

17. In a process of purifying mineral oil the step which comprises treating a mass of said oil with liquid anhydrous ammonia under pressure and in the presence of a catalyst.

18. In a process of purifying mineral oil the step which comprises treating a mass of said oil with liquid anhydrous ammonia at a low temperature.

19. In a process of purifying mineral oil the step which comprises treating a mass of said oil with liquid anhydrous ammonia under pressure and at a low temperature.

In testimony whereof I have affixed my signature, in the presence of two witnesses.

JOHN COLLINS CLANCY.

Witnesses:
HOWARD C. RIPLEY,
HELEN M. BARNBROOK.